United States Patent Office 3,813,340
Patented May 28, 1974

3,813,340
METHOD OF PRODUCING CRYSTALLINE SILICON CARBIDE WHISKERS
Wilhelmus Franciscus Knippenberg and Gerrit Verspui, Emmasingel, Eindhoven, Netherlands, assignors to U.S. Philips Corporation, New York, N.Y.
Continuation of application Ser. No. 712,550, Mar. 26, 1968, which is a continuation-in-part of application Ser. No. 667,700, Sept. 14, 1967, both now abandoned. This application Feb. 10, 1971, Ser. No. 114,374
Claims priority, application Netherlands, Sept. 15, 1966, 6613012; Nov. 22, 1966, 6616397; Mar. 1, 1967, 6703399, 6703400
Int. Cl. C01b *31/36;* C04b *35/56*
U.S. Cl. 252—62.3 C                    5 Claims

ABSTRACT OF THE DISCLOSURE

Method for controlling the growth of silicon carbide crystals by carrying out the growth in the presence of an element of Group III–B of the Periodic System of the elements, especially, lanthanum. The wurtzite modifications can be produced, which will be useful in semiconductor devices. In addition, very long thin whiskers can be produced useful for reinforcing other materials.

---

Figure 1:
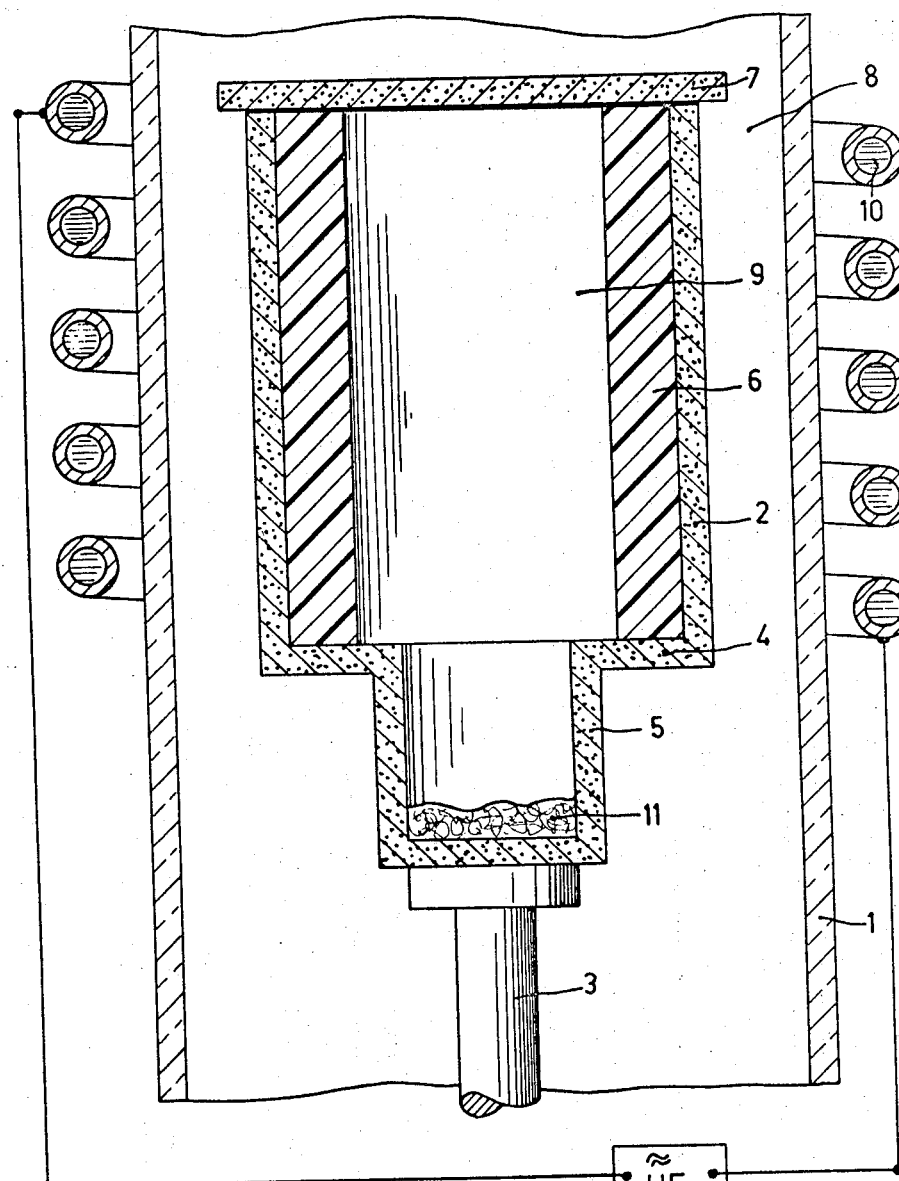

This application is a continuation of application Ser. No. 712,550, filed Mar. 26, 1968 which is a continuation-in-part of application Ser. No. 667,700, filed Sept. 14, 1967, both now abandoned.

The invention relates to a method of producing crystalline silicon carbide and in particular to a method for controlling the form and/or the structure of silicon carbide.

Various methods are known for producing crystalline silicon carbide, which may exhibit various crystal structures, for example, the cubic crystal structure and various hexagonal crystal structures. Also, a single crystal of grown silicon carbide may be composed of alternate layers of different structure. See, for example, Philips Res. Reports, *18*, 161–274 (1963); Philips Technical Review, *24*, 181–183 (1962/63); Philips Technical Review, *26*, 187–189 (1965); and British Pat. 1,015,844, which describes in detail various methods for growing silicon carbide crystals and the kinds of structures that result, the contents of which publications are hereby incorporated by reference. As is described in these publications, one known method using thermal decomposition or reaction, for example, grows the silicon carbide from compounds containing silicon and carbon by chemical reactions at a comparatively high temperature. The starting substances are frequently in the gaseous state, and in the starting substances the required silicon and carbon may occur in one compound, for example, in an alkyl silane or in an alkyl silane substituted entirely or in part by halogen, or in different compounds, for example, a hydrocarbon and a silane or a halogen silane. The starting compounds may undergo thermal decomposition, and other substances such as hydrogen taking part in the reaction may be provided. The resultant silicon carbide which is deposited on a heated support may have the form of a compact layer or may consist of a large number of more or less separate crystals. In general, these crystals have a cubic structure which in many cases is strongly twinned. They may further comprise regions grown in hexagonal modifications.

Silicon carbide may also be produced by means of a reaction between carbon and silica, preferably in hydrogen. In this case, gaseous products are formed which may cause the silicon carbide to be deposited at a certain distance from the starting substances. Furthermore, silicon carbide crystals may be formed by recrystallization at a very high temperature in a space enclosed by silicon carbide, as is described in the Lely U.S. Pat. No. 2,854,364. In the latter process, the temperatures used are above 2000° C., for example, 2500° C. Plate-shaped hexagonal crystals are then obtained which are uniformly developed in the lateral direction. For the major part, these crystals exhibit the 6H structure (see nomenclature in the Philips Research Reports publication), but certain crystals could also be composed of alternate layers of different structure. The use of the reaction between carbon and silica, especially when carried out on a large scale in a manner known as the Acheson process, generally resulted in the formation of polycrystalline lumps, but fairly well-defined hexagonal crystals could also be formed in voids in this mass at temperatures exceeding 2000° C.

The British patent suggests heating carbon and silica at temperatures between 1375° C. and 1500° C. in an atmosphere of hydrogen and nitrogen at a slightly reduced pressure, which under favorable conditions could result in the formation of wire-shaped crystals having diameters of the order of microns. Since these wire-shaped crystals were obtained only in a nitrogen-containing atmosphere, they were strongly doped with nitrogen, which is a donor in silicon carbide, so that only n-type crystals could be obtained in this manner. Thus, the possibilities of using these crystals for electrical or electronic device purposes are limited. For various non-electrical uses, the dimensions of the elongated crystals obtained are comparatively small. Wire-shaped crystals are also obtained in an atmosphere of pure hydrogen, with the silica and carbon used as starting substances, preferably separated. The silicon carbide is formed by reaction of the carbon with silicon vapor and/or gaseous silicon monoxide (SiO) obtained by reduction of the silicon dioxide ($SiO_2$) used. The wire-shaped crystals obtained generally have a cubic structure. The diameters of these crystals are also comparatively small, i.e., of the order of 0.1 to 1µ.

From these prior art methods, it thus appears that the form or the structure of the silicon carbide produced was dependent upon the method of production used, with different methods resulting in different structures. Moreover, many of the structures resulting could be obtained only incidentally to the method used, which was thus not a reliable technique for reproducing the structure on a mass basis.

An object of the present invention is a method for controlling the form and/or the structure of the silicon carbide crystals during their production. Another object of the invention is a method for making special silicon carbide structures or forms, hitherto obtained only incidentally and in a non-reproducible manner, in a reliable and reproducible manner. A further object of the invention is a method for obtaining long crystalline whiskers of silicon carbide with a suitable length, width and thickness so that they exhibit great strength for use, for example, in reinforcing structural materials. Another object is a method of growing silicon carbide whiskers of thicknesses of at least 10μ with lengths of several centimeters. It is moreover an object to provide a method for making crystals of elongated structure whose electrical properties can be tailored as desired and which may also contain p-n junctions.

These and other objects of the invention are realized by carrying out the growth of the silicon carbide crystals in the presence of a special element which influences the form and/or structure of the crystals, which element hereinafter is referred to as a growth modifier. Some elements belonging to Group III-B of the Periodic System, which group comprises the elements scandium, yttrium, the lanthanides, also referred to as rare earth metals, and actinium have shown growth modifier properties, but whereas cerium and yttrium may show such properties to a small extent only, especially good results have been obtained using lanthanum. In particular, we have discovered that, when silicon carbide is produced at temperatures lying between 1000° C. and 2000° C., the presence of lanthanum may result in the formation of the wurtzite modification of silicon carbide in a very high yield. The most favorable temperature for the formation of such a structure lies between 1250° C. and 1600° C. We have also found that when aluminum is also added, crystals with wurtzite structure can be more readily formed at a comparatively low temperature in the aforesaid range, for example, between 1250° C. and 1400° C., whereas by adding nitrogen, crystals with wurtzite structure can be formed more readily at a comparatively high temperature, for example, between 1400° C. and 1600° C. In the latter range, when aluminum is added, in general crystals of a different structure are mainly formed, that is, of the 4H structure, and these crystals can be manufactured in this manner with a high yield and in a reproducible manner. For growing silicon carbide crystals at temperatures lying between 1000° C. and 2000° C. as described above, use can best be made of the chemical reaction methods, the starting substances being preferably constituted by silica and carbon and the thermal treatment being effected preferably in a hydrogen-containing atmosphere. However, it is also possible to use other starting substances, for example, gaseous starting substances as is also known.

It should be noted that the various crystalline structures of silicon carbide have different electrical properties, such as their energy gap and the mobility of their charge carriers. For example, the wurtzite structure of silicon carbide has the desirable electrical property of the largest energy gap found hitherto of all the silicon carbide structures, viz. 3.3 ev. Large energy gap semiconductor crystals are very useful in the manufacture of semiconductor devices, e.g. high temperature devices.

We have also discovered that the presence of lanthanum causes a tremendous growth of whiskers or elongated silicon carbide crystals, which are preferably formed at a temperature exceeding 2000° C. A particularly suitable temperature range lies between 2200° C. and 2600° C. In this case, elongated crystals are obtained which have considerably larger diameters than those obtained by the methods described above for producing wire-shaped crystals. The crystals obtained comprise a small amount of lanthanum, generally between 5 and 100 p.p.m. At these high temperatures, the silicon carbide crystals can be formed in a space or cavity having a heated wall of silicon carbide. Silicon and carbon are transported from the mass of silicon carbide forming the wall to the crystals growing in the space. A protective gas is provided which may consist of an inert gas preferably at atmospheric pressure approximately, but lower pressures and even higher pressures may also be used. While normal recrystallization methods may produce crystals of 10 x 10 x 1 mm.$^3$, in the presence of lanthanum we have obtained whiskers of e.g. 5 x 0.1 x 0.02 mm.$^3$, the length of which has so far been limited only by the length of the cavity in which they were grown. Such whiskers are very strong and have important applications for reinforcing or strengthening materials such as plastics, glass and metals to produce composite materials having low weight and high strength at high temperatures, in the same manner that glass fibers have been used in the prior art to reinforce or strengthen plastic materials. Such fiber-reinforced materials are useful in all structural applications where high strength, low weight materials are desirable. See, for instance, the article by M. L. Yaffee entitled "Composite Materials Offer Vast Potential for Structures" in "Aviation Week and Space Technology," May 3, 1065. Such silicon carbide whiskers should also prove useful in the making of very strong glasses, by embedding the whiskers within the glass.

By means of the invention, it is possible to manufacture both p-type crystals and n-type crystals for use in semiconductor devices. Also, the active impurity composition and content, we have found, has an effect on the cross-sectional shape in the recrystallization technique. For example, when elongated p-type crystals are manufactured by the addition of aluminum, the shape of the crystals is more ribbon-like, whereas when n-type crystals are manufactured by the addition of the donor nitrogen, they are wire- or needle-shaped with more or less circular cross-sections. Of course, well-known donor and acceptor impurities may be added in succession to obtain p-n junctions. Between the steps of using the different impurities the silicon carbide may be cooled down to a temperature of less than 2000° C., which enables a better control of the area of epitaxial growth in the subsequent crystallization step. The crystallization space may in the meantime be freed from the impurity used in the previous step, which results in the formation of more abrupt pn junctions. In the case that p-type crystals are grown by the addition of the acceptor aluminum, which crystals are more or less ribbon-shaped, and subsequently a donor, for example, nitrogen, is added in order to obtain n-type material, n-type material grows on one side or both sides of the surface of the ribbon-shaped crystals in their direction of thickness so that an np or npn structure is obtained. It is also possible to add a donor in a first step and an acceptor in a second step.

The crystals thus obtained may have widths and thicknesses of the order of 0.01 to 0.1 mm. and lengths of the order of centimeters.

Figure 2:
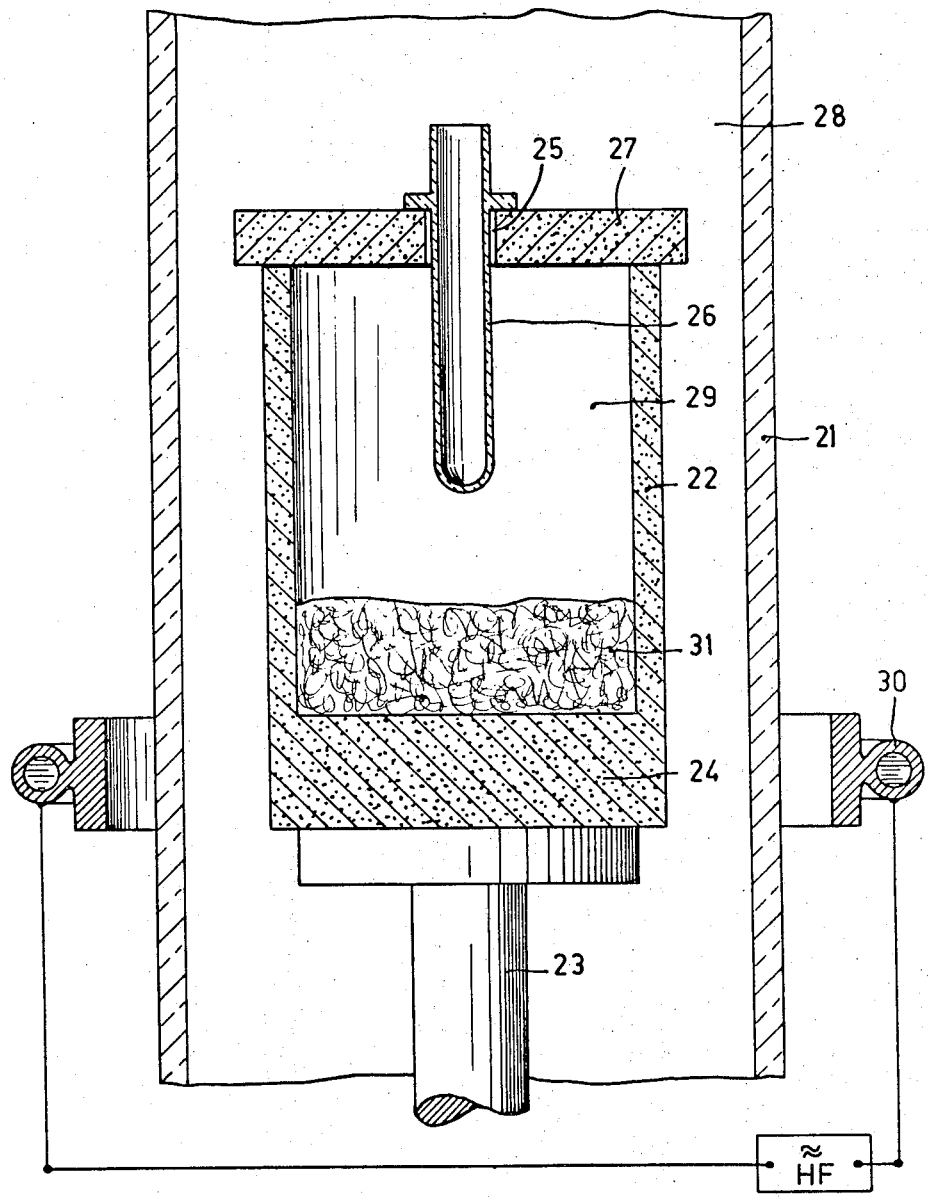
Figure 7:
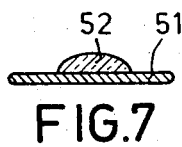
Figure 8:
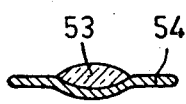
Figure 9:
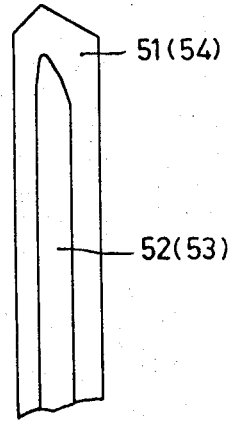

Several exemplary embodiments of the invention will now be described with reference to the accompanying drawing, in which: FIG. 1 is a diagrammatic vertical sectional view of one form of apparatus for producing silicon carbide crystals by recrystallization; FIG. 2 is a diagrammatic vertical sectional view of apparatus for producing silicon carbide crystals by chemical reaction from silica and carbon; FIGS. 3-6 are cross-sectional views illustrating various ways in which the silicon carbide crystals can be utilized; FIGS. 7 and 8 are cross-sectional views and FIG. 9 part of a plan view of silicon carbide whiskers having a pn junction.

The apparatus shown in FIG. 1 includes a vertically arranged tube 1 of quartz glass in which an atmosphere of the desired composition may be provided. A cylindrical graphite crucible 2 is arranged inside the tube 1 on a support 3. At the center of its base 4 the crucible 2 has a depending portion 5. In the crucible 2 is provided as a wall liner a cylindrical body 6 of silicon carbide. The dimensions of the cylinder 6 were: length of 100 mm., outer diameter of 70 mm., inner diameter of 45 mm. The cylinder 6 of silicon carbide is supported on the base 4 of the crucible. The crucible 2 is covered by a cover 7 of graphite which loosely rests on the crucible and permits diffusion of gas between the space 8 limited by the tube 1 and the cavity 9 enclosed by the cylinder 6. The tube 1 is surrounded by a high-frequency coil 10 at the level of the silicon carbide cylinder 6. In order to satisfactorily thermally insulate the crucible 2, the latter is embedded in graphite felt (not shown) which has satisfactory thermally insulating properties.

When the crucible 2 is heated in a protective gas atmosphere, for example by flowing argon through the tube 1, by the energization of the high-frequency coil, for example, to 2500° C., plate-shaped silicon carbide crystals adhering to the inner wall of the cylinder 6 are formed in known manner within the cavity 9.

EXAMPLE 1

In accordance with the invention, however, before the apparatus described is assembled, about 3 grams of a charge 11 consisting of pulverulent or granular lanthanum oxide ($La_2O_3$) is provided in the depressed portion 5 of the crucible 2. The cylinder 6 in the example consists of sintered, very pure silicon carbide, obtained, for example, by pyrolysis of methyltrichlorsilane in hydrogen at 1600° C. During the assembly, the crucible 2 is arranged with respect to the high-frequency coil 10 so that the part including the silicon carbide ring 6 is located inside the coil 10 and the depressed portion 5 below this coil. After the assembly, the air is first replaced by argon of atmospheric pressure and the crucible 2 is then heated by energization of the high-frequency coil 10 so that the cylinder 6 assumes a temperature of approximately 2590° C. After 4 hours, the assembly is cooled and the crucible 2 is removed. Colorless, ribbon-shaped silicon carbide crystals in the form of whiskers having lengths of the order of centimeters and diameters of the order of 10 to 100$\mu$ have formed on the inner wall of the cylinder 6 completely filling the space 9.

EXAMPLE 2

Similar results were obtained by heating for 3 hours at 2550° C., the whiskers formed having lengths up to 5 cms., a width of about 100$\mu$ and a thickness of about 20$\mu$.

EXAMPLE 3

In this example, during the heating, 10% by volume of nitrogen was added to the gas and the resultant mixture passed through the tube 1 instead of argon alone. Elongated n-type crystals were obtianed having approximately similar dimensions in their direction of width as in their direction of thickness, which are of the order of 10 to 50$\mu$.

EXAMPLE 4

In this example, the cylinder 6 was formed by sintering light green silicon carbide obtained by the known Acheson process. The lanthanum oxide was replaced by 5 g. of a commercially available mixture of rare earth metals consisting of approximately half lanthanum and 5 g. of carbon powder. After heating for three hours at 2500° C. in an atmosphere of argon containing 1% of nitrogen, the crystallization space 9 was completely filled with green, needle-shaped whiskers of a length up to 5 cm. and a thickness of about 50$\mu$.

EXAMPLE 5

In this example, the cylinder 6 was obtained by compressing silicon and carbon in a ratio by weight of 1:1 in the form of powders, mixed with a binder, for example, arabic gum. In the part 5 of the crucible 2 was provided 6 g. of a mixture of lanthanum oxide and aluminum carbide in a ratio by weight of 1:1. Heating was first carried out at 1450° C. for two hours to convert the tube 6 into silicon carbide. Then the temperature was raised to 2500° C. Within three hours, ribbon-shaped silicon carbide whiskers of a length up to 5 cm., a width up to 1 mm. and a thickness of about 10$\mu$ were grown.

EXAMPLE 6

The tube 6 in this case was formed by compressing a mixture of sand and carbon in a ratio by weight of 4:1. In the part 5 of the crucible 2 was provided 3 g. of lanthanum oxide. After heating in a $CO_2$ atmosphere for three hours at 1700° C., the mixture of sand and carbon was converted into silicon carbide. Then, the temperature was raised to 2500° C. Within 3 hours, the crystallization space was completely filled with whiskers of a length up to 5 cm.

EXAMPLE 7

In this case, the cylinder 6 was composed of sintered, very pure silicon carbide. The charge 11 was composed of a mixture of aluminum carbide and lanthanum oxide in a weight ratio of approximately 1:1. Pure argon was provided as the atmosphere, and the heating temperature was 2500° C. Elongated p-type crystals were obtained which were substantially ribbon-shaped and had thicknesses of the order of 10$\mu$ and widths of the order of 100$\mu$. Afterwards, the charge 11 was replaced by a charge which consisted only of lanthanum oxide and the cylinder 6 with the ribbon-shaped crystals grown therein was again treated according to the method as described in Example 3. The originally ribbon-shaped crystals were found to have grown especially in the direction of thickness, with n-type material having grown on the p-type material. Many crystals had an accretion of n-type material only on one surface, but other crystals had an accretion on both surfaces of the originally ribbon-shaped p-type material.

Preferred additions are aluminum and nitrogen, since these substances influence not only the conductivity properties but also the growth of the transverse dimensions of the crystals. Aluminum gives rise to formation of comparatively wide ribbon-shaped crystals whereas narrower more needle-shaped crystals are formed in the presence of nitrogen. The order of succession in which these additions are applied hardly influences the cross-sections of the ribbon-shaped structures thus obtained.

If, as shown on an enlarged scale in a cross-sectional view in FIG. 7, first an aluminum-doped ribbon-shaped crystal 51 is formed, the narrower nitrogen-doped epitaxial accretion 52 will extend along a flat plane at the area of the junction. If, however, the order of succession is reversed and, as shown in sectional view in FIG. 8, first a nitrogen-doped crystal 53 is formed which has a more or less oval cross-section, the aluminum-doped silicon carbide 54 will grow thereon epitaxially beyond the width of the crystal 53. In both cases, a structure is obtained as shown schematically in the plan view of FIG. 9. The aluminum-doped silicon carbide is denoted herein by 51(54) and the nitrogen-doped silicon carbide by 52(53) in the same manner as in FIGS. 7 and 8.

The crystals obtained may be used in the manufacture of diodes by dividing into portions of suitable length and, if desired, by removing the thin parts protruding sideways by sandblasting and the application of ohmic contacts to the parts 51(54) and 52(53).

The crystals may further be used as whiskers for other purposes, e.g., as reinforcements in composite materials. For the latter purpose the special form within cross-section, a relatively thick middle part running sideways into more or less tapered parts, may be favorable.

Other suitable donors, e.g. phosphorus, or acceptors e.g. boron, may be used for obtaining crystals of n-type or p-type conductivity, respectively, or for obtaining crystals having pn-junctions.

EXAMPLE 8

A mixture of 3 grams of lanthanum oxide and 3 grams of aluminum carbide is introduced into part 5 of the crucible 2. A current of argon of 0.5 l./min. is passed through the device and then a temperature of 2550° C. is maintained for 4 hours by means of the coil 10. Ribbon-shaped p-type SiC-crystals having $5 \times 10^{19}$ charge carriers per cc. are then deposited on the wall of the tube 6. These ribbon-shaped crystals have a length of up to 40 mm., a width of up to 1 mm. and a thickness of up to 50$\mu$. Subsequently, the temperature is decreased, the solid aluminum carbide is removed and the device is rinsed with argon at a temperature of 1900° C. in order to remove as far as possible the residues of Al from the crystallization space. The argon is then replaced by nitrogen and the temperature is raised to 2550° C. In 4 hours, n-type silicon carbide having $10^{20}$ charge carriers per cc., a thickness of up to $20\mu$ and a width slightly smaller than that of the subjacent p-type substrate crystal (as shown in FIGS. 7 and 8) is deposited on the p-type ribbon-shaped crystals, in many cases only on one side, throughout their lengths.

It should be noted that the inner diameter of the silicon carbide cylinder used in these examples was approximately 45 mm. and that the growth in the longitudinal direction of the crystals, which would be across the cylinder, was thus limited by the size of the cylinder. We have found crystals that have grown as far as the opposite side of the cylinder and then been bent around in the cavity 9 due to their growing further in a longitudinal direction. Therefore, it may be expected that longer crystals will be obtained with larger apparatus, especially a larger cavity 9.

In the methods of production described above by way of example, a gas atmosphere was used at atmospheric pressure. However, as mentioned before, in principle atmospheres may be used of higher and lower pressure alternatively.

With respect to the structure of the silicon carbide crystals obtained, it should be noted that these crystals generally had the 6H structure, but other structures were also found which may be formed also with the use of the known recrystallization method. More particularly, a ribbon-shaped epitaxial growth of cubic structure (zinc blende) on originally hexagonal elongated crystal material was found.

More especially this cubic overgrowth may be obtained in a reproducible manner when, after the formation of the whisker-shaped substrate crystals of hexagonal silicon carbide in a space having a heated wall of silicon carbide and in the presence of lanthanum at temperatures between 2300° C. and 2600° C., the space is quenched to temperatures below 1900° C. in the presence of lanthanum in the crystallization atmosphere. A coherent ribbon-shaped overgrowth of cubic silicon having about the same length as the substrate crystal is deposited.

The formation of a cubic overgrowth is further promoted by quenching in the presence of nitrogen in the crystallization space.

When the hexagonal substrate crystals are removed, for example, by etching or grinding, cubic SiC-crystals can be obtained having a length of a few cms. and a thickness of from $5\mu$ to $20\mu$. When aluminum is added to the atmosphere, widths up to approximately 1 mm. are obtained, whereas the addition of nitrogen results in widths of a few tenths of a mm. The desired conductivity properties may be imparted to these crystals, as the case may be, after splitting them up into smaller parts, in a manner known as such in semiconductor technology by incorporation in the lattice of atoms determining the conductivity properties in so far as these crystals should not have obtained these properties already from the gaseous phase during their formation. It is obvious that it is also possible to obtain pn junctions in the crystals with known technique. Atoms influencing other properties of silicon carbide may also be incorporated by means of such techniques.

Furthermore the crystals, with the cubic part left combined with the hexagonal substrate crystals, may be used as heterojunctions, and also in this case the properties may be modified by incorporation of other atoms during or after the formation of the crystals. Of course the crystals may also be used in view of their favorable mechanical properties in the way described before, e.g. in composite materials.

EXAMPLE 9

A mixture of 3 grams of lanthanum oxide and 3 grams of aluminum carbide is introduced into part 5 of the crucible 2. A current of argon of 0.5 l./min. is passed through the device, whereupon a temperature of 2500° C. is maintained for 4 hours by means of the coil 10. Ribbon-shaped p-type silicon carbide crystals having $5 \times 10^{19}$ charge carriers per cc. are deposited on the wall of the tube 6. These ribbon-shaped hexagonal crystals have lengths up to 40 mm., widths up to 1 mm. and thicknesses up to $50\mu$. Subsequently, the assembly is cooled, the solid aluminum carbide is removed and the device is rinsed with a current of argon containing 0.1% by volume of nitrogen. The temperature is then raised to 2650° C. and subsequently rapidly decreased to a temperature below 1900° C. by switching off the coil 10. Cubic silicon carbide having $10^{17}$ nitrogen atoms per cc. and having a width slightly smaller than that of the substrate crystals and a thickness of up to $20\mu$ is epitaxially deposited on the ribbon-shaped hexagonal crystals substantially over their entire lengths. The hexagonal substrate crystals having a higher conductivity, can be removed from the n-type cubic crystals by electrolytic etching with hydrofluoric acid.

EXAMPLE 10

5 grams of lanthanum oxide and 5 grams of aluminum carbide are introduced into part 5 of the crucible 2 and a current of argon of 1 l./min. is passed through the device. A temperature of 2550° C. is maintained for 4 hours. Hexagonal p-type crystals having lengths of up to 40 mm., widths up to 1 mm. and thicknesses of up to $50\mu$ are then deposited on the wall of the tube 3.

Subsequently, the temperature is raised to 2650° C. and is then rapidly decreased to a temperature below 1900° C. A. slightly smaller ribbon of cubic silicon carbide having a thickness of approximately $20\mu$ is then epitaxially deposited on the hexagonal substrate crystals throughout their lengths.

Thus, a ribbon-shaped crystal is obtained which throughout its length has a hetero-junction between p-type cubic and p-type hexagonal silicon carbide. Contact layers consisting of an alloy of gold containing 5% of tantalum and 5% of aluminum are applied to both sides of the junction by vapour deposition and re-heating at 1400° C. Finally, the ribbon-shaped crystal is subdivided by means of a diamond-paste wire saw to form a large number of diodes of 1 mm. x 0.1 mm.

EXAMPLE 11

3 grams of lanthanum oxide are introduced into part 5 of the crucible 2 and a temperature of 2550° C. is maintained for 4 hours in a current of argon which contains 10% by volume of nitrogen and is passed through at a rate of 0.5 l./min. Wire-shaped hexagonal n-type silicon carbide crystals are formed having lengths of up to 40 mm., widths of up to 0.3 mm. and thicknesses of up to $30\mu$. After slowly cooling and rinsing with pure argon, 2 to 3 grams of aluminum carbide are introduced into the crucible. The temperature is then raised to 2600° C., whereupon the temperature is rapidly decreased to a temperature below 1900° C. Cubic p-type silicon carbide is epitaxially deposited throughout the lengths of the substrate crystals already formed. The composite ribbon-shaped crystal thus obtained is finally processed in the manner described in Example 10 to form a large number of miniature diodes of the kind having a hetero-junction of p-cubic and n-hexagonal silicon carbide.

EXAMPLE 12

2.5 grams of lanthanum oxide are introduced into part 5 of the crucible 2 and a temperature of 2500° C. is maintained for 4 hours in a current of argon of 0.5 l./min. Wire-shaped hexagonal silicon carbide crystals are formed having lengths of up to 40 mm., width of up to 0.3 mm.

and thicknesses of up to 30μ. After an increase of the temperature to 2650° C. and quenching to a temperature below 1900° C., an epitaxial growth of cubic silicon carbide having a thickness of approximately 30μ is formed throughout the length of the substrate crystals already formed. The hexagonal substrate crystals are removed by grinding. The cubic ribbon-shaped crystals obtained are then heated at 2400° C. for 1 hour in a silicon carbide cavity 9 (see FIG. 1) in a current of argon containing 10% by volume of nitrogen, while boron carbide is present in part 5 of the crucible 2. During this comparatively, short heating, substantially no cubic silicon carbide is converted into hexagonal silicon carbide and boron and nitrogen are diffused into the crystals. Owing to the fact that boron diffuses more rapidly into the silicon carbide than nitrogen, these elements penetrate into the crystals to different depths forming pn junctions in them.

With reference to FIG. 2, one example of a method of producing silicon carbide crystals by chemical reaction at a temperature below 2000° C. will now be described. The apparatus shown in FIG. 2 includes a vertically arranged tube 21 of quartz glass in which a desired atmosphere can be provided. A cylindrical graphite crucible 22 is arranged inside the tube 21 on a support 23. The graphite crucible 22 has a thickened base 24 and can be covered by a graphite cover 27 in which a central opening 25 is provided. A thin-walled tube 26 of pyrographite which is closed at its lower end and is open at its upper end is passed through this opening 25 until its lower end is located approximately at the center of the cavity 29 enclosed by the crucible 22. The tube 21 is surrounded by a high-frequency coil 30 and the crucible 22 is arranged with respect to this coil so that the coil 30 surrounds the base 24 of the crucible. In order to obtain a satisfactory thermal insulation, the crucible 22 is surrounded by a graphite felt (not shown).

EXAMPLE 13

A charge 31 containing silica was provided on the graphite base 24 of the crucible and the device shown in FIG. 2 was then assembled. Subsequently, hydrogen gas at atmospheric pressure was passed through the tube 21. When the charge 31 was of pure quartz, wire-shaped crystals of cubic silicon carbide were formed at temperatures of, for example, 1500° C. and higher. In accordance with our invention, however, lanthanum oxide was added. Thus, the material 31 contained silicon dioxide and lanthanum sesquioxide ($La_2O_3$), for example, in a weight ratio of 10:1. The gas current consisting of hydrogen at atmospheric pressure was passed through the tube and the high-frequency coil was energized, as a result of which the crucible 22 was heated, more particularly from its base, so that the center of the cavity 29 was at a temperature of 1380° C. This temperature can be measured in that the glow temperature of the base of the graphite tube 26 is measured from above in a manner known as such by means of an optical pyrometer (not shown). After 15 hours, the assembly was cooled. Elongated wire- or needle-shaped crystals had formed on the charge 31, on the inner wall of the crucible 22, on the cover 27, and on the wall of the graphite tube 26, practically all of which crystals were found to consist of silicon carbide with wurtzite structure. When alumina was added to the charge, at a temperature of 1300° C., p-type wurtzite crystals were obtained, whereas with the addition of nitrogen to the gas passed through the tube 21, n-type wurtzite crystals were obtained at a temperature of, for example, 1500° C. Furthermore, by modification of the dopings in known manner, pn-junctions can be obtained.

When both lanthanum oxide and alumina are added to the charge 31 and with the temperature at 1480° C., silicon carbide crystals were obtained which practically entirely exhibit the 4H structure.

Figure 3:
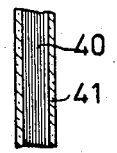

FIGS. 3–6 illustrate various ways for utilizing the silicon carbide whiskers obtained by the methods of the invention. As shown in FIG. 3 on an enlarged scale, bunches of whiskers 40 obtained as described in Example 1 are placed in tubes 41 of aluminum borosilicate glass. These tubes are alternately joined with rods 42 of the same glass to form a bunch as is shown diagrammatically in FIG. 4. By conventional glass techniques, this bunch is fused to form a glass rod or filament which is reinforced by the silicon carbide whiskers 40.

Figure 5:
Figure 4:
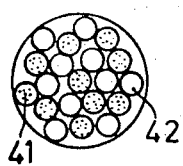

As shown in FIG. 5 of the drawing, whiskers 43 obtained as described in Example 5 are arranged up to a height of 1 mm. in parallel in a carbon mold 44, the internal dimensions of which are: length 6 cm., width 2 cm. and height 1 cm. The mold is half-filled with aluminum at a temperature of 700° C. After cooling, the ingot obtained is removed from the mold and rolled in a direction at right angles to the direction of the whiskers to form a foil with a thickness of 100μ. The resultant foil exhibits, in the longitudinal direction of the whiskers, a considerably higher tensile strength than aluminum foil obtained in the same manner without the addition of the whiskers.

Figure 6:

FIG. 6 illustrates a plate-shaped filter of silicon carbide whiskers, comprising a platinum dish 45, the bottom of which is provided with apertures 46. The bottom of the dish carries a mass of whiskers 47 of a thickness of 2 mms. arranged in arbitrary directions. Because of the high chemical resistance of the SiC, the filter is suitable for filtering highly reactive liquids and gases.

As is evident from the examples given, it is not necessary that the lanthanum used as the growth modifier be present in its pure state. Commercially available mixtures of rare earth metals having a high lanthanum content have proven quite suitable. Nor is it necessary for the lanthanum or lanthanum-containing mixture to be in the elementary or metal state. Compounds such as oxides or carbides of lanthanum are satisfactory, and even advantageous because of their moderate evaporation when heated. Thus, the growth modifier may be provided in any form, element or compound, at which the element itself is made available at the growth temperatures used. The quantity of the growth modifier provided does not appear to be very critical. We have obtained the results of the invention with quantities of the lanthanum present in the growth cavity in the recrystallization technique which are small in comparison with the amounts of silicon carbide in the cylinder 6. Larger quantities of lanthanum, when not excessively large, do not seem to interfere with the growth process. It is difficult to establish the precise range since it will depend on, for instance, the size of the crystallization space and the temperatures employed. We have found from experimentation that, with the crystallization space formed by the sintered tube having the dimensions given in Example 1, the method being carried out at a temperature of 2450° C., a quantity of 0.5 g. of lanthanum oxide was insufficient to obtain whisker growth, whereas increasing the lanthanum oxide content to 3 g. yielded a heavy growth of whiskers without any wafer-shaped crystal formation. From the examples given above, and depending upon the quantity of silicon carbide to be converted to whiskers or the desired crystalline form and, for example, the wall area of the crystallization space available, those skilled in the art will encounter no difficulty in ascertaining experimentally the lanthanum quantities necessary to obtain the results of our invention.

As is also evident from the recrystallization examples given, the silicon carbide vessel—in the examples having a cylindrical form which of course is not essential—which defines the crystallization space may be previously formed by compression and sintering, or formed so to speak in situ from silicon and carbon and/or compounds thereof at temperatuers below 2000° C. into the silicon carbide desired, after which the lanthanum is added to convert same into the whisker or other form desired by heating to a temperature exceeding 2000° C. The last-mentioned embodiment offers the advantages that the vessel can be composed of silica and carbon, inexpensive raw materials, and converted in a single operation into, for example, the desired whisker form.

Although the previous Examples relate more especially to the use of lanthanum as a growth modifier element, other elements of the III–B Group of Elements of the Periodic System are found to be operative as a growth modifier as may be illustrated by the next Examples, which more especially relate to whisker growth at temperatures above 2000° C. In these Examples use is made of an apparatus as described before with reference to FIG. 1, in which the silicon carbide ring 6 is formed and dimensioned as described in Example 1.

EXAMPLE 14

15 grams of cerium oxide are provided in the depressed portion 5 of crucible 2. In the quartz glass tube 1 an atmosphere of argon at about atmospheric pressure is established. By energizing the HF induction coil 9 crucible 2 is heated to a temperature of 2250° C. After two hours ribbon-shaped silicon carbide whiskers are formed, evenly distributed over the entire inner surface of the silicon carbide ring 6. The whiskers formed have lengths of some mms., broadnesses of about 200μ and thicknesses of about 10μ.

EXAMPLE 15

4 grams of yttrium oxide are provided in portion 5 of crucible 2. Argon gas of atmospheric pressure is provided in tube 1 and crucible 2 is heated in a manner as described in Example 14 at a temperature of 2400° C. After heating for five hours silicon carbide whiskers have been formed on the entire inner wall of the silicon carbide cylinder 6 having lengths of about 10 mms., broadnesses of about 100μ and thicknesses of about 10μ.

EXAMPLE 16

10 grams of gadolinium oxide are provided in portion 5 of crucible 2. Argon gas of about atmospheric pressure is provided in tube 1 and crucible 2 is heated at a temperature of 2370° C. After heating for five hours silicon carbide whiskers have been formed mainly in a broad zone on the lower part of the silicon carbide ring 6, on bottom 4 and on part of the wall of portion 5. The whiskers have lengths of about 10 mms., broadnesses of about 200μ and thicknesses of about 20μ.

EXAMPLE 17

6 grams of neodymium oxide are provided in portion 5 of crucible 2. Argon gas of about atmospheric pressure is used in tube 1 and crucible 2 is heated at a temperature of 2370° C. for 3½ hours. As described in Example 16 most whiskers were formed in a broad zone at the lower part of crucible 2, the whiskers having lengths somewhat exceeding 10 mms., broadnesses of about 150μ and thicknesses of about 15μ.

EXAMPLE 18

In a manner substantially as described in Example 15 but using in tube 1 argon gas to which 1% by volume of nitrogen was added, and using a charge of 5 grams of yttrium oxide, green fluorescent needle-shaped silicon carbide whiskers were obtained, having lengths of about 10 mms. and thicknesses of about 10μ were obtained.

Although until now, among the III–B Group of Elements the highest yield of whiskers formed at temperatures above 2000° C. has been obtained with lanthanum, also with other elements good whisker growth is obtained. Said whiskers are also doped with the growth modifying Group III–B element used. In this respect it is possible to obtain whiskers with special physical properties such as special luminescence properties. As is known special luminescence properties of several materials may be obtained by the addition of rare earth elements. Example 18 illustrates that yttrium may give luminescent properties to silicon carbide. Further cerium has the advantage that raw materials with high contents of cerium are available in substantially inexpensive form. For instance, impure cerium oxide, comprising about 90% of pure cerium oxide, is much cheaper than raw materials consisting mainly of lanthanum oxide.

Further it is found that in the temperature range between 2200° C. and 2600° C. for using Group III–B elements, in general temperatures below 2450° C. are suitable in general for obtaining whiskers in a fair yield, whereas especially with lanthanum high yields are obtained also at higher temperatures, especially in a range between 2450° C. and 2550° C.

It is further remarked that it is most simple to carry out the above processes at about atmospheric pressure, but that the invention is not limited to such a pressure. Higher or lower pressures may be used in principle and, as the case may be, the heating temperature may be adapted to such a pressure for obtaining most favourable conditions.

We may further remark that the invention is not limited to the special elements mentioned in the examples. For instance whisker growth under substantially similar conditions as those mentioned in Examples 14–18 is obtainable in the case of using scandium oxide, praseodymium oxide, europium oxide and samarium oxide.

Further also in these cases materials for doping the silicon carbide for influencing the conductivity and conductivity type may be added. For instance whiskers of the type illustrated in FIGS. 7 and 9 comprising pn-junctions may be obtained by using in portion 5 of crucible 2 (FIG. 1) cerium oxide and aluminum oxide and heating first e.g. at 2350° C. during 3 hours in argon gas and subsequently during 2 hours in an argon-nitrogen gas mixture.

The whiskers herein described and grown in the presence of elements other than lanthanum may be used for the same purposes as those obtained in the presence of lanthanum, such as mentioned before, for instance for use in reinforcing other materials and in objects as already described.

Further, it is to be understood that, when speaking of the presence of an element of Group III–B of the Periodic System, the Group III–B element need not be present in elemental form but may be present in the form of a compound.

While we have described our invention in connection with specific embodiments and applications, other modifications thereof will be readily apparent to those skilled in this art without departing from the spirit and scope of the invention as defined in the appended claims.

What we claim is:

1. A method of producing whiskers of silicon carbide crystals comprising the step of forming said crystals in a gaseous atmosphere containing silicon and carbon at a temperature between 1000° C. and 2600° C. and at which said crystals grow in the presence of an element selected from the group consisting of scandium, yttrium, lanthanum and the rare earth metals.

2. A method of producing whiskers of silicon carbide crystals comprising the step of forming said crystals in a gaseous atmosphere containing silicon and carbon at a temperature between 2000° C. and 2600° C. and at which said crystals grow in the presence of an element selected from the group consisting of scandium, yttrium, lanthanum and the rare earth metals.

3. A method of producing whiskers of silicon carbide crystals having a wurtzite structure comprising the step of forming said crystals in a gaseous atmosphere containing silicon and carbon at a temperature between 1000° C. and 2000° C. and at which said crystals grow in the presence of lanthanum.

4. A method as claimed in claim 3 in which aluminum is present in an amount effective to produce silicon carbide crystals at a temperature between 1250° C. and 1400° C. which are p-conductive.

5. A method as claimed in claim 3 in which nitrogen is present in an amount effective to produce silicon carbide crystals at a temperature between 1400° C. and 1600° C. which are n-conductive.

References Cited
UNITED STATES PATENTS

| | | | |
|---|---|---|---|
| 3,520,740 | 7/1970 | Addamiano | 252—62.3 X |
| 3,236,780 | 2/1966 | Ozarow | 252—301.4 |
| 3,285,018 | 11/1966 | Henderson et al. | 252—516 X |

OTHER REFERENCES

Kirchner et al.: "Journal of the American Ceramic Society," vol. 46, No. 4, pp. 299–300 (1963).

OSCAR R. VERTIZ, Primary Examiner

J. COOPER, Assistant Examiner

U.S. Cl. X.R.

106—44; 423—346; 252—516

PO-1050
(5/69)

UNITED STATES PATENT OFFICE
CERTIFICATE OF CORRECTION

Patent No. 3,813,340   Dated May 28, 1974

Inventor(s) WILHELMUS F. KNIPPENBERG ET AL

It is certified that error appears in the above-identified patent and that said Letters Patent are hereby corrected as shown below:

Column 1, line 7, change "Mar. 26," to read --Mar. 12,--

Column 1, line 28, change "Mar. 26," to read --Mar. 12,--

Column 3, line 73, change "5 x 0.1" to read --50 x 0.1--

Signed and sealed this 22nd day of April 1975.

(SEAL)
Attest:

RUTH C. MASON
Attesting Officer

C. MARSHALL DANN
Commissioner of Patents
and Trademarks